(12) United States Patent
Chen et al.

(10) Patent No.: US 7,159,219 B2
(45) Date of Patent: Jan. 2, 2007

(54) METHOD AND APPARATUS FOR PROVIDING MULTIPLE DATA CLASS DIFFERENTIATION WITH PRIORITIES USING A SINGLE SCHEDULING STRUCTURE

(75) Inventors: Jian-Guo Chen, Basking Ridge, NJ (US); David P. Sonnier, Austin, TX (US); Ambalavanar Arulambalam, Edison, NJ (US); David E. Clune, Califon, NJ (US)

(73) Assignee: Agere Systems Inc., Allentown, PA (US)

( * ) Notice: Subject to any disclaimer, the term of this patent is extended or adjusted under 35 U.S.C. 154(b) by 739 days.

(21) Appl. No.: 10/037,164

(22) Filed: Dec. 21, 2001

(65) Prior Publication Data

US 2003/0120705 A1 Jun. 26, 2003

(51) Int. Cl.
*G06F 9/46* (2006.01)
*G06F 11/00* (2006.01)

(52) U.S. Cl. .............. 718/103; 718/100; 718/102; 370/229; 370/230

(58) Field of Classification Search ............ 714/30; 711/140, 141; 370/229–416; 345/419; 718/100–108; 707/10
See application file for complete search history.

(56) References Cited

U.S. PATENT DOCUMENTS

| | | | | |
|---|---|---|---|---|
| 5,528,513 A | * | 6/1996 | Vaitzblit et al. ............ 718/103 |
| 5,572,522 A | * | 11/1996 | Calamvokis et al. ....... 370/390 |
| 5,946,297 A | * | 8/1999 | Calvignac et al. .......... 370/230 |
| 6,014,367 A | * | 1/2000 | Joffe ........................... 370/230 |
| 6,157,963 A | * | 12/2000 | Courtright et al. ............. 710/5 |
| 6,341,303 B1 | * | 1/2002 | Rhee et al. ................. 718/104 |
| 6,457,008 B1 | * | 9/2002 | Rhee et al. .................... 707/10 |

OTHER PUBLICATIONS

Bhatti et al., "Web Server Support For Tiered Services", IEEE, Oct. 1999, pp. 64-71.*
Li, "Network Traffic Control and Bandwidth Management in Internet: A Differentiated Services Case Study", School of Computer Science, McGill University, Montreal, 1999, pp. 1-119.*
Horlait et al., "An Implementation of Differentiated Services Using Active Network", IEEE Workshop on Networking, 1999, pp. 1-7.*

* cited by examiner

*Primary Examiner*—Meng-Al T. An
*Assistant Examiner*—Jennifer N. To

(57) ABSTRACT

A scheduler for shared network resources implementing a plurality of user selectable data scheduling schemes within a single hardware device. The schemes include strict priority, priority for one class plus smooth deficit weighted round robin for the other classes, bandwidth limited strict priority and smooth deficit weighted round robin for all user classes. The network operator selects one of the four schemes by enabling or disabling certain bits in the hardware device.

13 Claims, 4 Drawing Sheets

METHOD AND APPARATUS FOR PROVIDING MULTIPLE DATA CLASS DIFFERENTIATION WITH PRIORITIES USING A SINGLE SCHEDULING STRUCTURE

FIELD OF THE INVENTION

This invention relates to a scheduler for managing a shared network resource, and more particularly, to a scheduler providing a plurality of selectable scheduling algorithms.

BACKGROUND OF THE INVENTION

Computer networks allow users to share or multiplex resources such as printer servers, routers, file systems, long-distance data trunks, search engine servers and web site servers. However, sharing of these resources introduces a contention problem for the shared resource. Consider, for example, a plurality of queries made to a server hosting a worldwide web search engine. Each query represents a service request from a user and contends for full access to the shared resource (i.e., the search engine) with other users accessing the search engine. Typically, the server can serve only one request at any given time so that all requests arriving while the server is busy must wait. The busy server holds the incoming search request in a service queue until it eventually selects the request for service. As more requests accumulate in the service queue, the server must use a scheduling algorithm to decide which request is served next. Generally, it is desirable for the server implement a scheduling algorithm that fairly shares the server resource.

It may also be necessary or desirable to assign a priority to the users, based either upon the class to which the user is assigned (based, for instance, on the fee paid by the user for service by the network device) or the type of data awaiting service. Generally, such priority assignments are beneficial only if there is contention for the network resource. As more users are assigned to the resource, the probability for contention increases.

Although there are many types of data carried over a network, these can be generally categorized into two data types with respect to latency and other network performance aspects that can distort the signal, or render it unusable, at the receiving end. The first data type is relatively insensitive to the network performance and is able to accept whatever performance the network provides. For example, a file transfer application ideally prefers to have an infinite bandwidth (which is generally measured in bits or bytes per second) and a zero delay as the bytes or packets traverse their intended route. Under these conditions the file will reach its destination in the fastest and most expeditious manner. However, if there is degraded network performance because, for example, the available bandwidth decreases or the end-to-end delay increases, this will not substantially affect the file transfer application. The file will still arrive at the destination, albeit later than under ideal conditions. Thus the performance requirements for such applications can adapt to the available network resources. The network only promises to deliver the application packets, without guaranteeing any particular performance bound. These are also referred to as best-efforts networks.

The second class of applications or data types requires a performance bound. For example, an application that carries voice as a 64 Kbps data stream becomes nearly unusable if the network provides less than 64 Kbps over the end-to-end link. It is also known that usable telephone conversations generally are limited to a round-trip delay of less than about 150 ms. To carry data for this telephony application, the network must guarantee a bandwidth of 64 Kbps and a round trip delay of less than 150 ms. These applications thus demand a guarantee of service quality (e.g., higher bandwidth and lower throughput delay) from the network.

To allow the co-existence of both the best efforts and guaranteed service applications or data types on a network, and reasonably fair processing of both types of packets, the network typically implements a quality of service or a grade of service scheme for processing the packets. Certain networks also implement a combination of both quality of service and grade of service criteria. The grade of service scheme provides individual subscribers with predetermined priority processing values based upon the service selected and paid for by the subscriber. Thus the subscribers paying a higher monthly fee for the resource receive a higher priority in the form of a greater bandwidth allocation. As a simple example, if a first network resource subscriber pays $100 per month for network access, it is allocated a bandwidth of 10 Kbps for the delivery of its packets. A second subscriber paying $10 per month is granted a bandwidth of 1 Kbps. Thus in any given one second interval the first subscriber is permitted to transmit 10 kilobits of data, while the second subscriber can transmit only one kilobit of data over the network resource. Once the second subscriber's assigned bandwidth is exhausted, incoming bits from the second subscriber are queued until the beginning of the next time interval. The first subscribers data bits are also queued when the allocated bandwidth has been exhausted, but because the first subscriber has a bandwidth ten times wider than the second subscriber, the first subscriber's data bits are served ten times faster than the second subscriber's.

A quality of service resource allocation scheme for assigning data priority examines the contents of the data bit streams and determines the priority based thereon. The higher priority data is transmitted through the network resource, while the lower priority data waits until bandwidth is available. Examples of high priority data include streaming audio and streaming video as well as voice over IP (VOIP), i.e., use of Internet-type packets for sending voice grade signals. In each case, the interruption of these data bits will significantly effect the quality at the receiving end. For instance, if the video stream is interrupted the data contained within the interrupted segments is lost, creating a distorted and incomplete video image at the receiving end. Comparatively, FTP data transfers or text transmitted from a web site can endure some level of interruption so long as the transmit time is not exceedingly long. Thus in this quality of service scheme the data source is not relevant to the priority assigned. Instead, the data type dictates the priority assignment.

To implement a quality of service scheme, in one embodiment a plurality of queues are formed, where each queue is populated with a specific data type. For example, one queue buffers video data and another queue buffers FTP data. To implement the quality of service scheme, the highest priority queue is always served first and typically served until the queue is empty. In this example, the highest priority queue would be the one buffering the video data. Once the video data queue is empty, the scheduler turns next to the next lower priority queue, for example audio data bits. Once the audio data queue is empty processing returns to the video queue to determine whether new video data bits have been buffered there. If none have appeared, the process jumps to the next lower priority data, and sends the bits buffered there. By continuously checking the buffering queues in order from the highest to lowest priority, the quality of service scheme is implemented.

Returning to a grade of service system, there are many known scheduling schemes for processing the data through the network shared resource. The simplest of these schemes serve the data packets on a first-come-first-served (or first-in-first-out, FIFO) basis. More complicated schemes assign weights to the data packets based on the subscriber's requested bandwidth. Several such scheduling schemes are discussed in *An Engineering Approach to Computer Networking* by S. Keshav, 1997, pages 209–263.

According to the prior art, one or more scheduling algorithms are typically implemented in a semiconductor device, using separate structures within the device for each of the scheduling algorithms. The router manufacturer selects the semiconductor device implementing the algorithm that it prefers, and incorporates the device in to the router such that the selected scheduling algorithm is operative.

To manufacture a semiconductor device implementing one or more scheduling algorithms, the hardware logic is designed and the design is verified. The chip layout is created and then the device is fabricated. In the event more than one scheduling algorithm is implemented in a single device, each is designed and verified individually and each occupies a separate region of the device. Thus more design and verification resources and real estate must be devoted to such a device due to the separately-implemented scheduling algorithms

SUMMARY OF THE INVENTION

The present invention provides a single algorithm, typically implemented in hardware, offering multiple operator-selectable scheduling schemes for processing data contending for a network resource. In one embodiment, four different scheduling schemes are embodied in the single architecture structure and thus share hardware logic elements. As implemented in a semiconductor device (either an application-specific integrated circuit or a custom designed device) the use of shared hardware elements reduces the space requirements of the device, allowing the fabrication of a smaller device or the inclusion of additional circuitry on the device. The use of a single architecture structure also simplifies the design verification process. Both of these advantages offered by the present invention accrue to the benefit of the semiconductor device manufacturer, reducing both the device cost and real estate.

The four scheduling schemes implemented in one embodiment include: unlimited strict priority among different user classes, bandwidth limited strict priority among different classes, one priority class plus smooth deficit weighted round robin for all other classes, and smoothed deficit weighted round robin.

The unlimited strict priority scheme provides service to each user class according to a priority ranking whenever bits are in the class queue. The bandwidth limited strict priority scheme also prioritizes the user classes but limits the bandwidth (number of bits per second) allocated to each class. Thus those classes having a wider bandwidth are able to send more data into the network resource over an equivalent time interval. In a priority plus smooth deficit weighted round robin scheme one class is assigned a priority and all others are served on round robin basis, modified by weights assigned to each class and further the serving of each class is smoothed so that one class does not dominate the others.

BRIEF DESCRIPTION OF THE DRAWINGS

The present invention can be more easily understood and the further advantages and uses thereof more readily apparent, when considered in view of the detailed description of the invention and the following figures in which.

DETAILED DESCRIPTION OF THE INVENTION

Figure 1A:
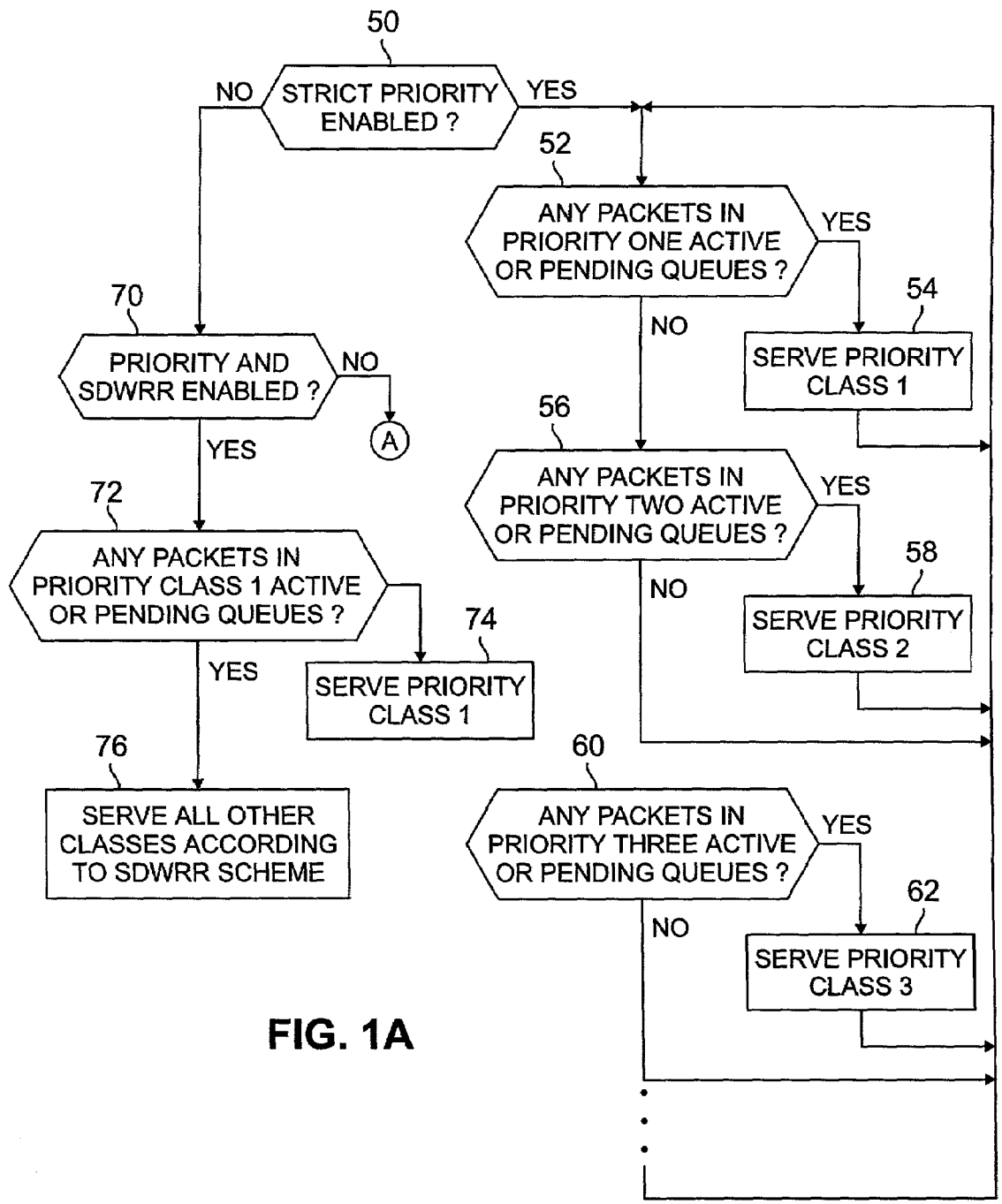
FIGS. 1A and 1B are flowcharts illustrating the operation of the present invention.
Figure 1B:
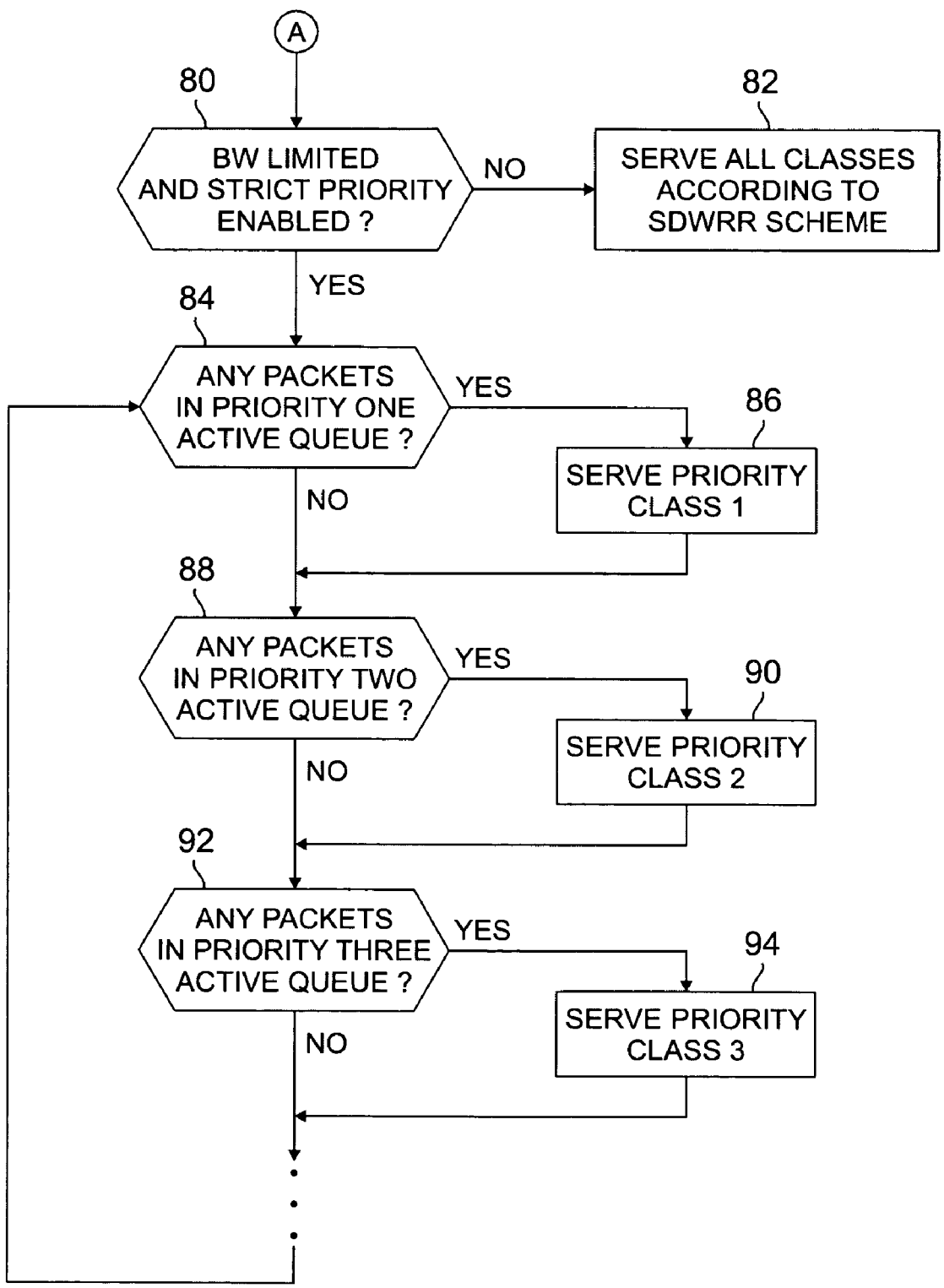

The flowchart of FIGS. 1A and 1B implements four different scheduling schemes using a single architecture. These scheduling schemes include: strict priority, strict priority plus smooth deficit weighted round robin, bandwidth limited strict priority and smooth deficit weighted round robin. As will be discussed below in conjunction with the hardware implementation of the algorithm, the operator of the network resource implementing the scheduling algorithm of FIGS. 1A and 1B, can select the operative scheduling scheme.

The algorithm begins at a decision step 50 where it is determined whether the strict priority scheduling scheme is enabled. If the result is affirmative, then the process moves to a decision step 52. To implement this scheduling scheme, all users sharing the network resource are prioritized as first, second, third, etc. Various processes for establishing the priority of a packet are known in the art. The classification engine that precedes the scheduler examines various fields in the packet header to, among another things, determine the packet priority. The priority can be based on the type of data carried by the packet (streaming video data has a higher priority than text data) or the origin of the data (certain users are granted a higher bandwidth allocation and thus effectively a higher data rate).

Irrespective of the manner in which the priority is determined, at the decision step 52 it is determined if there are any packets in the priority one active or pending queues. The active queue comprises the memory locations from which the packets or data are being served by the network resource. The pending queues are populated by the incoming packets while the active queue is being served. Thus immediately prior to serving the priority class, all packets in the pending queue for that class are transferred to the active queue for serving.

If any packets are present in the active or pending queues, they are served as indicated at a step 54. If the priority one active and pending queues are empty, then the scheduler checks the active and pending queues for priority class two at a decision step 56. The packets there are served by the network resource at a step 58 and then returns to the decision step 52, or the process returns to the decision step 52 if no priority class two packets are awaiting service. If during this pass through the decision steps 52 and 56 both the priority one and priority two active and pending queues are empty, then the priority class three queues are checked at a decision step 60 and serviced if required at a step 62. The process then returns to the decision step 52. Alternatively, if there are no priority class three packets in the active or pending queues, then the process returns to the decision step 54 for rechecking the priority one active and pending queues. As discussed above, typically, the priority class information is determined based on the data in one or more fields of the header region of the data packet, which determines the queue into which the packet is stored.

If the result from the decision step 50 is negative, then processing in moves to a decision step 70 where it is determined whether a priority plus smooth deficit weighted round robin scheduling scheme is enabled. If the response from the decision step 70 is affirmative then the process continues to a step 72 where the active and pending queues of priority class one are checked for waiting data. Any packets within those queues are serviced at a step 74. If no packets are in those priority class one queues, then the process continues to a step 76 where all the other classes seeking service at the network device are serviced according to a smoothed deficit weighted round robin scheduling scheme.

Conventionally, a round robin scheme serves a packet or a quantified number of bits from every non-empty queue. A weighted round robin scheme applies a weight to every queue and serves the queue in proportion to the weight. For example, a user class with a weight of three is served by processing three packets to every one packet served by a user class with weight of one. In an embodiment where the packets are not of equal size, a weighted round robin scheme divides the queue weight by the mean packet size to obtain normalized weights to govern the serving process.

In a deficit weighted round robin scheme a counter is associated with each class. The counters are set to an initial value based on the class weight and the maximum number of packets that can be served during each round-robin iteration. As packets are served from each class, the counter is decremented and in some cases may fall below zero. When a class counter is less than zero, the class is no longer served. At a predetermined time interval, a predetermined value is added to all class counters. Now all the classes with positive counter value are served and the counters decremented as packets are processed. The process then repeats at each predetermined interval.

In a smooth deficit weighted round robin scheme the number of packets served from each class is limited to a relatively small number so that each class is served relatively frequently. Without the smoothing process, it is possible for a class with a positive counter value to dominate the network resource as packets from that class continue to be sent until the counter value goes negative. The smoothing aspect tends to avoid this domination by serving only a limited number of packets from each class, irrespective of the counter value and the weight assigned If the response from the decision step 70 is negative, then the process continues to a decision step 80 where the process determines whether the bandwidth limited plus strict priority scheduling scheme is enabled. If the response is negative, the process continues to a step 82 where all the classes are served in accordance with a smooth deficit weighted round robin scheme as discussed above, less the priority assignment for one class.

If the response from the decision step 80 is affirmative, then the bandwidth limited strict priority scheme is enabled. According to this scheme, each class is assigned a portion of the available bandwidth, typically measured in bits per second. Thus the bandwidth assignment controls the number of data bits or packets that a class can send into the network resource. Typically, the bandwidth allocation is the same for each class, although this is not necessarily required. According to this scheduling scheme, the packets in the highest priority class queue are served, but the service is limited to a predetermined number of packets (or bits) during a predetermined time interval. Thus, if a 10 Kbps bandwidth is assigned, then only 10 kilobits of the first priority queued packets are sent in a one second interval. Once this bandwidth limit has been reached, whether there are remaining packets in the first priority queue, the scheduler moves to the class two priority queue. At the beginning of each time interval, the scheduler returns to the highest priority queue to serve the packets there, again limited to the assigned bandwidth value.

According to FIG. 1A and 1B, an affirmative response from the decision step 80 continues processing to a step 84 where the priority class one active queue is checked and the data in that queue is served to the limit of the bandwidth allocated to priority class one. If data is in the active queue it is served, as indicated at a step 86, as follows. For example, assume there are 8 kilobits of data in the priority class one queue and that queue is assigned a bandwidth of 10 kbps. Also assume that the time interval for serving each of the queues is 500 msec. Then 5 kilobits of data from the priority one queue will be served during the first pass through the priority one class active queue; 3 kilobits will remain in the queue. During the time the active queue is served, incoming bits are stored in the pending queue. Incoming bits are also stored in the pending queue while other priority classes are being served. At the start of the next pass through the priority one active queue, the 3 kilobits of data remain in that queue and assume that 4 kilobits of additional data has been added to the pending queue. All the data is now transferred to the active queue for processing, that is, a total of 7 kilobits of data. But only 5 kilobits can be processed due to the bandwidth assignment of the first priority class.

Returning to FIGS. 1A and 1B, from the step 86 where the priority class one data is served subject to the bandwidth limitations, processing returns to a decision step 88 to determine whether any packets are in the active queue of priority class two. Those packets are served at a step 94 as required. The process then moves to a decision step 92 to determine whether any packets are in the priority class three active queue. Any such packets are served at a step 92 and the process continues until all the priority classes are served, after which the process returns to the decision step 84.

Figure 2:
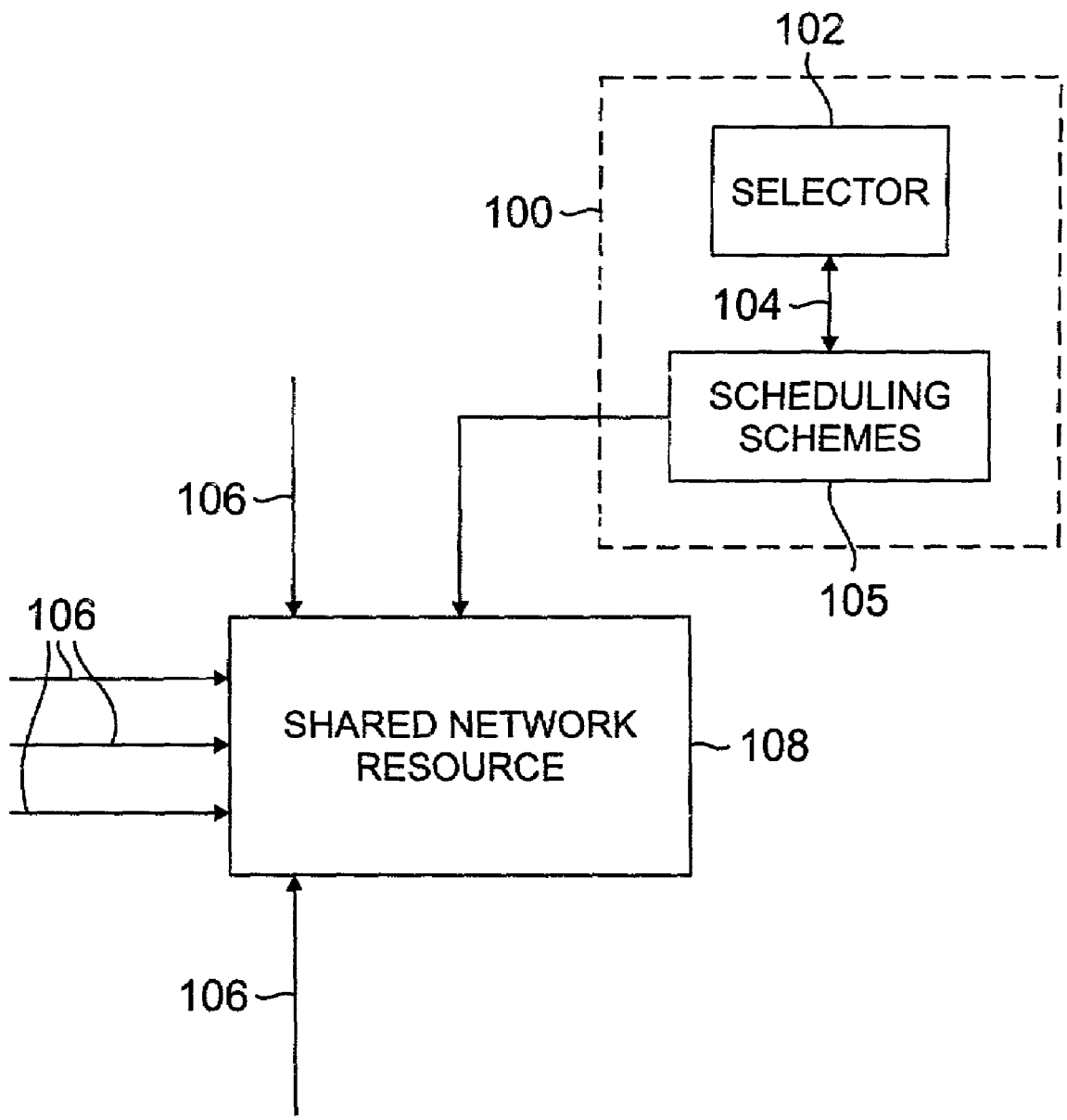
FIGS. 2 and 3 are block diagrams of a scheduler constructed according to the teachings of the present invention.

FIG. 2 is a block diagram of the principal elements operative with a scheduler 100 constructed according to the teachings of the present invention. A user operable selector 102 provides one or more signals on a link 104 to enable one of the scheduling schemes 105 described above. A plurality of input lines 106 provide data to a shared network resource 108 for serving the data on the plurality of input lines 106.

Figure 3:
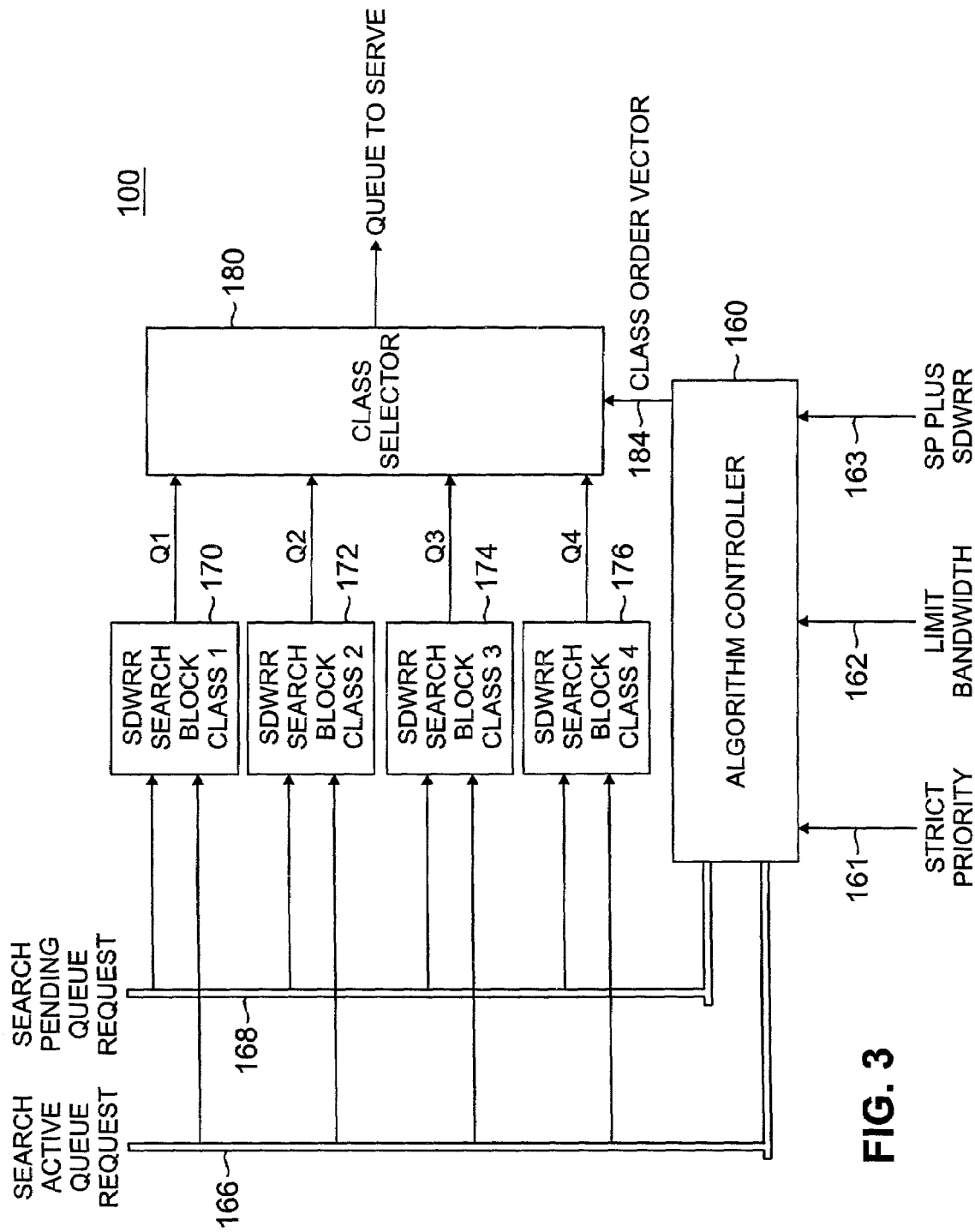

FIG. 3 is a detailed diagram of one embodiment of the scheduler 100, including an algorithm controller 160, having three control terminals 161, 162 and 163 for selecting the operative scheduling algorithm, i.e., strict priority, limited bandwidth strict priority and strict priority plus smooth deficit weighted round robin, respectively. One of the scheduling schemes is selected, for example, by placing a binary one on the selected control input while the other two lines carry a binary zero. In one embodiment this can be accomplished by applying a voltage to the selected line while the other two lines are connected to ground. If all three control terminals 161, 162 and 163 are at a binary zero value, then the default smooth deficit weighted round robin scheduling scheme is selected.

In the example of FIG. 3, four priority classes are assumed, although the invention is not limited to four priority classes. Thus there are shown four search blocks 170, 172, 174 and 176 for implementing the smooth deficit weighted round robin (SDWRR) scheduling scheme as discussed above and described in the referenced commonly-owned patent application. Each of the SDWRR blocks 170, 172, 174 and 176 processes input data related to their respective priority class queues to determine if data is waiting to be processed. For example, SDWRR block 170 process all the queues assigned a priority one class.

Two output signals carried over links 166 and 168 from the algorithm controller 160 are input to the SDWRR search blocks 170, 172, 174 and 176. The signals on the links 166 and 168 enable checking of the active queue, the pending queue or both queues by the SDWRR search blocks, according to the scheduling scheme selected by the scheduling algorithm, as determined by the signals on the control terminals 161, 162 and 163. Thus the signals carried on the links 166 and 168 activate one or both of the active and pending queues, and the SDWRR search blocks 170, 172, 174 and 176 execute the SDWRR scheduling algorithm on the selected queue or queues. For instance, if strict priority is selected by placing the appropriate control signal on the control terminal 161, then both the active and the pending queues are checked for scheduling. If the bandwidth limited strict priority scheme is selected then only the active queue is checked. If the strict priority plus SDWRR scheme is selected then both queues are checked for the priority class (class 1 in the FIG. 3 embodiment) and only the active queue is checked for the remaining classes.

The output signal from each of the SDWRR blocks 170, 172, 174 and 176 identifies whether the queue checked by the SDWRR block has any data waiting to be serviced. This information is input to a class selector 180 for selecting the queue to be serviced by the network processor from among the four eligible queue identifiers input thereto having data waiting to be serviced. The class selector 180 is controlled by a class order vector signal from the algorithm controller 160 over a link 184, that controls the order in which the eligible classes are serviced. The class order vector signal indicates the starting point for the class selection process executed by the class selector 180, and further the class selector 180 tracks serving of the eligible queues in accordance with the class order vector signal to ensure that each class is served in accordance with the selected scheduling scheme.

For example, if the strict priority scheme is enabled, then according to the flowchart of FIG. 1, priority class one is always serviced when there is data in the active or pending queue of a priority class one user. The SDWRR block 170 determines whether the active or pending queues of the priority class one users are holding data, and if data is present in one of these active or pending queues, then the class one queue is presented to the class selector 180 for service. Also, in response to the selection of the strict priority scheduling scheme, the class order vector signal on the link 184 commands the class selector 180 to always service priority class one users when presented to the class selector 180. This result is reflected in the FIG. 1 flowchart by the output path from the step 54. Note that once the priority class one user is served at the step 54, the process loops back through the decision step 52 to determine whether any other priority one packets are awaiting service. This continuing loop-back ensures that any time data is waiting in a priority class one active or pending queue, it is serviced. If no data is present in the active or pending queues of the priority class one users, the SDWRR block does not input a signal to the class selector 180. Then the class selector checks the priority class two signal from the SDWRR block 172 for an indication that there is priority class two data waiting for service. Next the class selector 180 checks the priority class one signal from the SDWRR block 170 again, since this is required by the strict priority scheduling scheme as the priority class one users always have priority over the other users. The other scheduling schemes are similarly implemented by the FIG. 3 hardware elements as indicated in the FIG. 1 flowchart.

The hardware implementation illustrated in FIG. 3 represents a reduction in the area required for a scheduler offering several user selectable scheduling schemes in an integrated circuit, as compared with the prior art schedulers. In the prior art, to implement four different scheduling schemes requires the use of four distinct hardware elements, each receiving the data to be serviced and each processing the data in accordance with its scheduling scheme. According to the present invention, the four scheduling schemes are implemented in a single hardware device with a single scheduling block (that is, the SDWRR blocks 170, 172, 174 and 176) the operation of which is controllable for selecting the desired scheduling scheme.

Although certain preferred embodiments of the present invention are disclosed and illustrated herein, modifications and changes may be apparent to those skilled in the art. It is therefore understood that the appended claims are intended to cover all such modifications and changes that are within the spirit of the invention.

What is claimed is:

1. An integrated circuit structure for controlling data processing by a shared network resource according to a scheduling scheme, wherein the data is supplied from a plurality of network users, each network user assigned a data processing priority, said integrated circuit structure comprising:
   a first circuit module capable of commanding one of a plurality of scheduling schemes responsive to control signals input thereto;
   a plurality of processing blocks each responsive to data supplied from a different priority user, each one of the plurality of processing blocks indicating whether data from an associated user is waiting to be processed;
   a second circuit module responsive to the first circuit module and the plurality of processing blocks, wherein the second circuit module commands a first, second or third scheduling scheme, wherein the first scheduling scheme processes user data according to a user's priority when user data is waiting to be processed, and wherein the second scheduling scheme processes all data of a highest priority user whenever highest priority user data is waiting to be processed followed by data of all users having data waiting to be processed according to the user's priority, and wherein the third scheduling scheme processes data from all users during a time interval.

2. The integrated circuit structure of claim 1 wherein the first scheduling scheme comprises a strict priority scheduling scheme for processing data according to the user's priority, the second scheduling scheme comprises a strict priority scheduling scheme for the highest priority user and a round robin scheduling scheme for all other users, and the third scheduling scheme comprises a round robin scheduling scheme for all users.

3. The integrated circuit structure of claim 1 wherein the second circuit module controls the network resource to service data from each user in accordance with a commanded scheduling scheme.

4. The integrated circuit structure of claim 1 wherein each one of the plurality of processing blocks further comprises a data queue for storing data received from the associated user, and wherein the network resource services data from each user by reading data from the data queue of the user in accordance with a commanded scheduling scheme.

5. The integrated circuit structure of claim 1 wherein each one of the plurality of processing blocks further comprises a pending queue for storing incoming data packets and an active queue from which data is serviced by the network resource.

6. The integrated circuit structure of claim 1 wherein the data is in the form of data packets.

7. The integrated circuit structure of claim 1 wherein a network operator supplies the control signals to the first circuit module according to a desired scheduling scheme.

8. An apparatus for selecting data from a plurality of network users for service by a shared network resource, wherein the data from each one of the plurality of network users is assigned to a priority class, and wherein a scheduling scheme for selecting the data for servicing by the network resource is selectable from among a plurality of scheduling schemes, said apparatus comprising:
- a controller for supplying a signal indicating an enabled scheduling scheme from among the plurality of scheduling schemes;
- a plurality of processing blocks each comprising a queue responsive to user data from an assigned priority class user and each providing an eligible queue output signal in response to data from the respective priority class user awaiting service; and
- a class selector for indicating the queue to be serviced in response to the eligible queue output signal from each one of said plurality of processing blocks and further in response to the signal indicating the enabled scheduling scheme, wherein according to a first scheduling scheme queued user data is processed according to a user's priority, and wherein according to a second scheduling scheme all queued user data of a highest priority user is processed whenever highest priority user data is queued followed by data of all users having queued user data according to the user's priority, and wherein according to a third scheduling scheme all queued user data is processed during a time interval.

9. The apparatus of claim 8 wherein the apparatus is incorporated in an integrated circuit.

10. The apparatus of claim 8 wherein the queue comprises a first queue and a second queue, the user data from the plurality of network users of each class is provided on one of said first and said second queue of the assigned one of the plurality of processing blocks, and wherein the scheduling scheme indicates whether said first queue or both said first and said second queues are serviced.

11. The apparatus of claim 10 wherein the first queue is an active queue and wherein the second queue is a pending queue, and wherein data is stored in the pending queue while the network resource services the data in the active queue.

12. The apparatus of claim 10 wherein the first scheduling schemes comprise a strict priority scheduling scheme for processing user data according to the user's priority, the second scheduling scheme comprises a strict priority scheduling scheme for the highest priority user and a round robin scheduling scheme for all other users, and the third scheduling scheme comprises a round robin scheduling scheme for all users.

13. For a shared network resource receiving data from a plurality of subscriber classes each class comprising a plurality of subscribers and each subscriber storing data to an active data queue or a pending data queue, a method for implementing a selectable scheduling scheme, from among a plurality of available scheduling schemes, for processing of data received from the plurality of subscribers by the network resource, the method comprising:
- determining the selected scheduling scheme;
- responsive to a first selected scheduling scheme processing data stored to the active and the pending data queues of a higher priority subscriber class before processing data from subscribers of a lower priority subscriber class; and
- responsive to a second selected scheduling scheme processing data stored to the active and the pending queues of the highest priority subscriber class, then processing data stored to the active and the pending queues the remaining subscriber classes according to a round robin scheduling scheme.

* * * * *

UNITED STATES PATENT AND TRADEMARK OFFICE
CERTIFICATE OF CORRECTION

PATENT NO. : 7,159,219 B2 Page 1 of 1
APPLICATION NO. : 10/037164
DATED : January 2, 2007
INVENTOR(S) : J-G. Chen et al.

It is certified that error appears in the above-identified patent and that said Letters Patent is hereby corrected as shown below:

In the claims:

Claim 12, col. 10, line 14, please delete "schemes comprise" and insert --scheme comprises--.

Claim 13, col. 10, line 39, please delete "queues the" and insert --queues of the--.

Signed and Sealed this

Tenth Day of April, 2007

JON W. DUDAS
*Director of the United States Patent and Trademark Office*